B. S. CHURCH.
Method and Apparatus for Detecting the Rate of Consumption of Water.

No. 221,521. Patented Nov. 11, 1879.

B. S. CHURCH.
Method and Apparatus for Detecting the Rate of Consumption of Water.
No. 221,521. Patented Nov. 11, 1879.

B. S. CHURCH.
Method and Apparatus for Detecting the Rate of Consumption of Water.

No. 221,521. Patented Nov. 11, 1879.

Attest,
G. W. Graham
John Boleschka

Inventor,
B. S. Church,
by Munsen & Philipp
Attys.

5 Sheets—Sheet 4.

B. S. CHURCH.
Method and Apparatus for Detecting the Rate of Consumption of Water.

No. 221,521. Patented Nov. 11, 1879.

Attest,
Geo. M. Graham
John Boleschka.

Inventor,
B. S. Church,
by
Munn & Philipp
Attys.

N. PETERS, PHOTO-LITHOGRAPHER, WASHINGTON, D. C.

5 Sheets—Sheet 5.
B. S. CHURCH.
Method and Apparatus for Detecting the Rate of Consumption of Water.
No. 221,521. Patented Nov. 11, 1879.
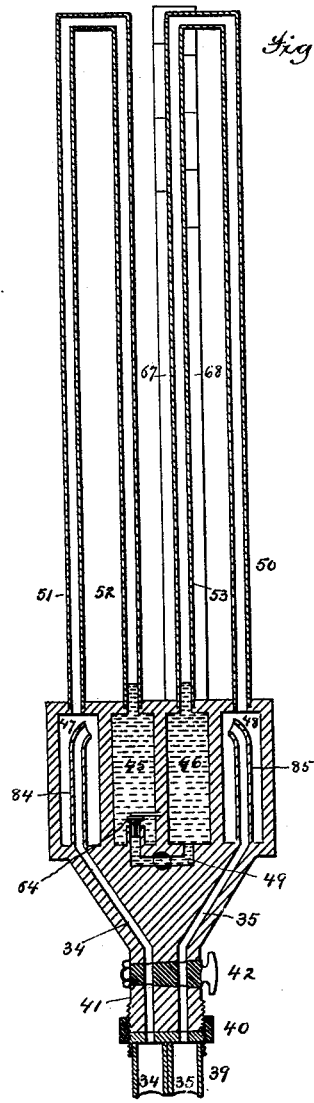
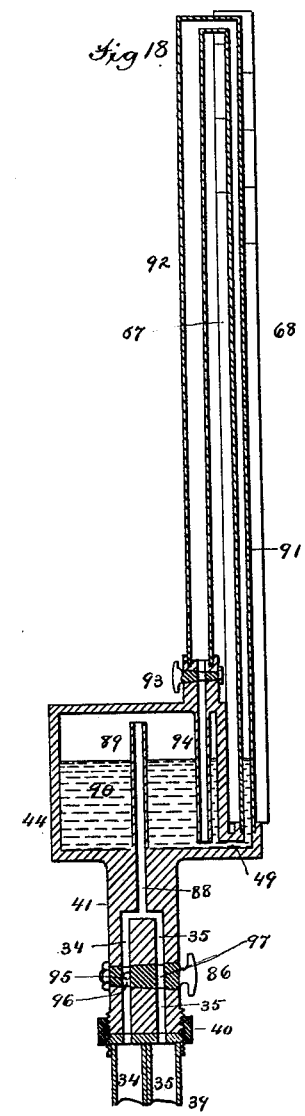

UNITED STATES PATENT OFFICE.

BENJAMIN S. CHURCH, OF SCARBOROUGH-ON-THE-HUDSON, NEW YORK.

IMPROVEMENT IN METHODS AND APPARATUS FOR DETECTING THE RATE OF CONSUMPTION OF WATER.

Specification forming part of Letters Patent No. 221,521, dated November 11, 1879; application filed September 24, 1879.

*To all whom it may concern:*

Be it known that I, BENJAMIN S. CHURCH, of Scarborough-on-the-Hudson, county of Westchester, and State of New York, have invented certain new and useful Improvements in Methods and Apparatus for Detecting or Determining the Rate of Consumption of Water; and I do hereby declare the following to be a full, clear, and exact description of the same, reference being had to the accompanying drawings, forming a part of this specification.

Great waste of water takes place in cities, towns, and villages having water supplied through a system of mains, owing to the negligence of users, the leaving of faucets and valves open in the winter to allow a continual flow of water to prevent the freezing of pipes, and for other reasons.

The object of my invention is to devise a method and apparatus that can be used by those having charge of such water-supplies to give an accurate knowledge of the rate of consumption of water, either during the day or night, in any building or number of buildings, or other places where the water is used, and thus detect waste of water; and my invention consists in the method of detecting or determining waste or consumption of water by the different pressures due to the flow or velocity of water in the inlet and outlet sides of a connection to the service-pipe or main transmitted to an indicating apparatus, and in the apparatus for carrying out said method, as will be hereinafter fully described and claimed.

Figure 1:
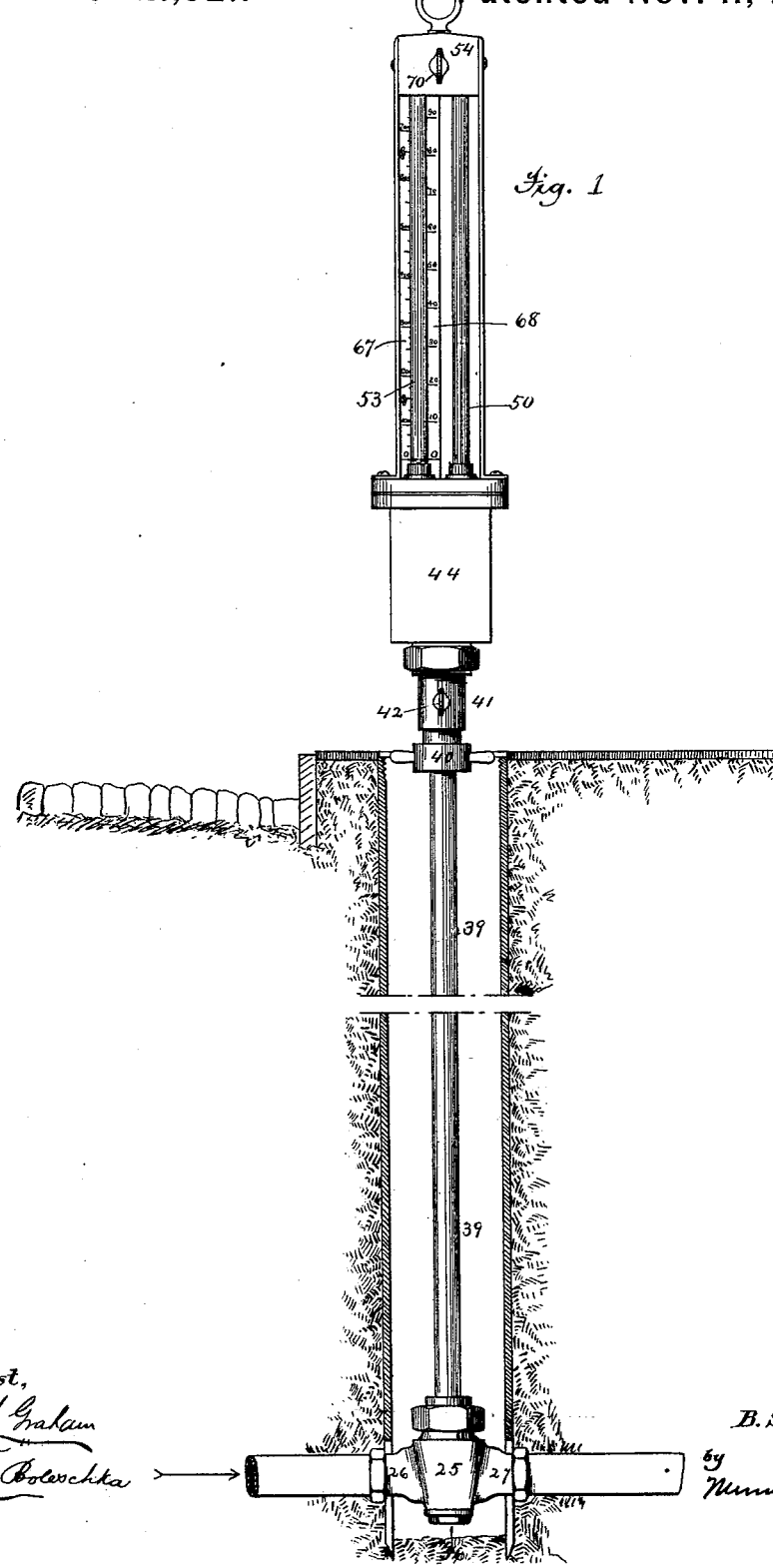
Figure 2:
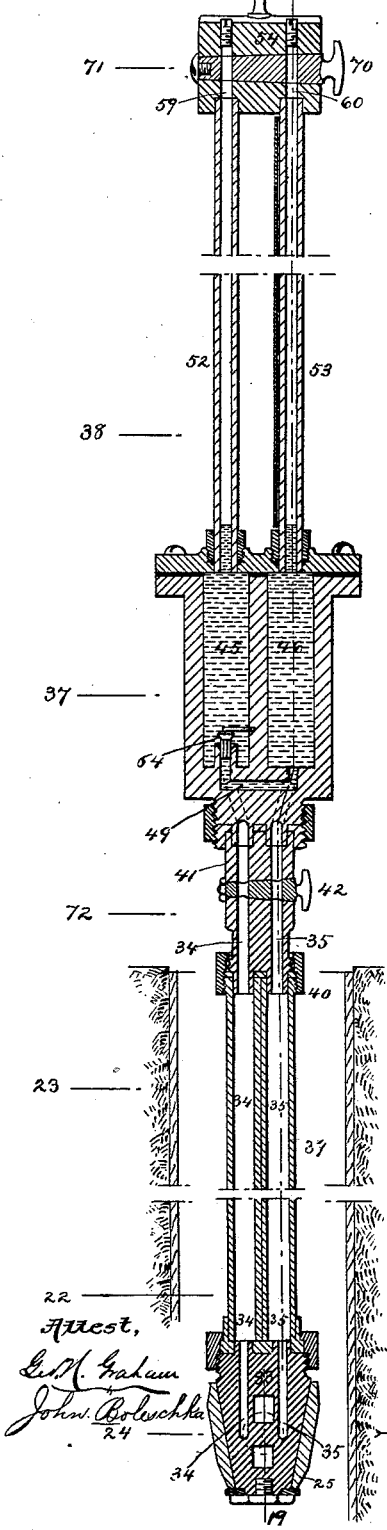
Figure 6:
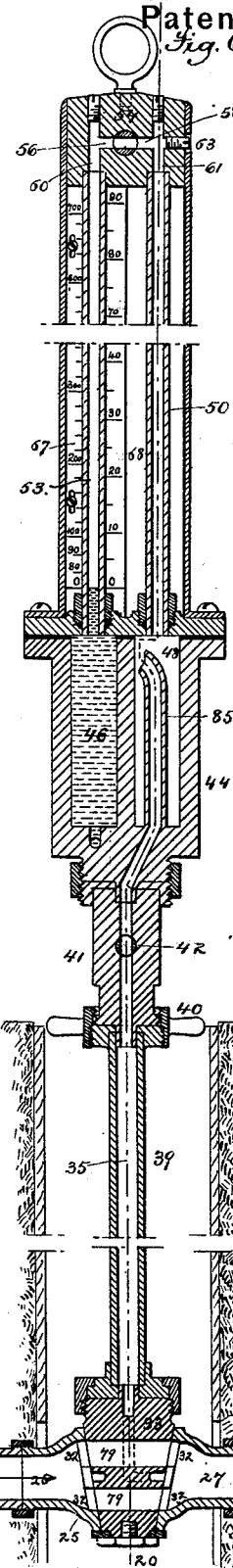
Figure 7:
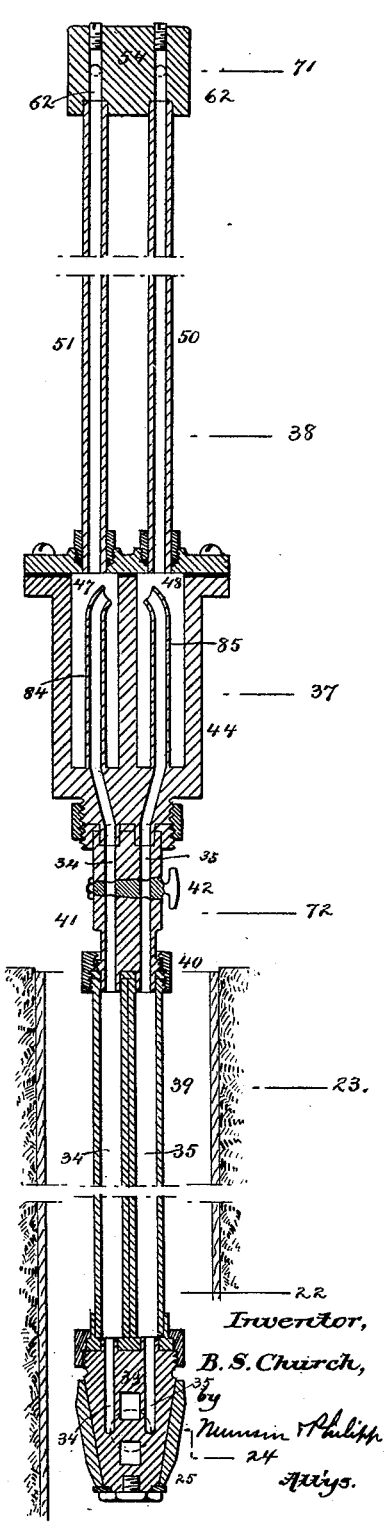
Figure 5:
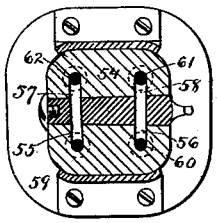
Figure 4:
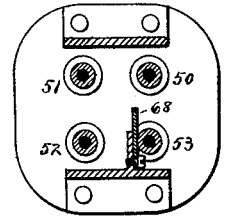
Figure 3:
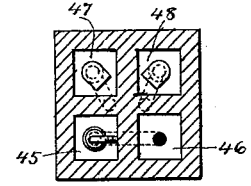
Figure 8:
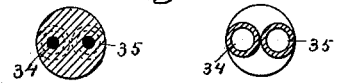
Figure 9:
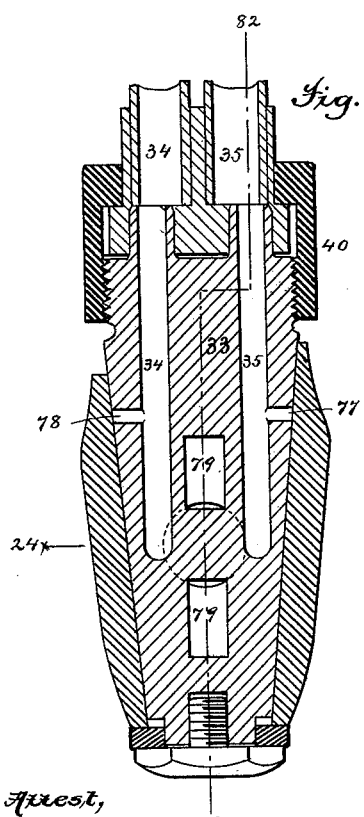
Figure 10:
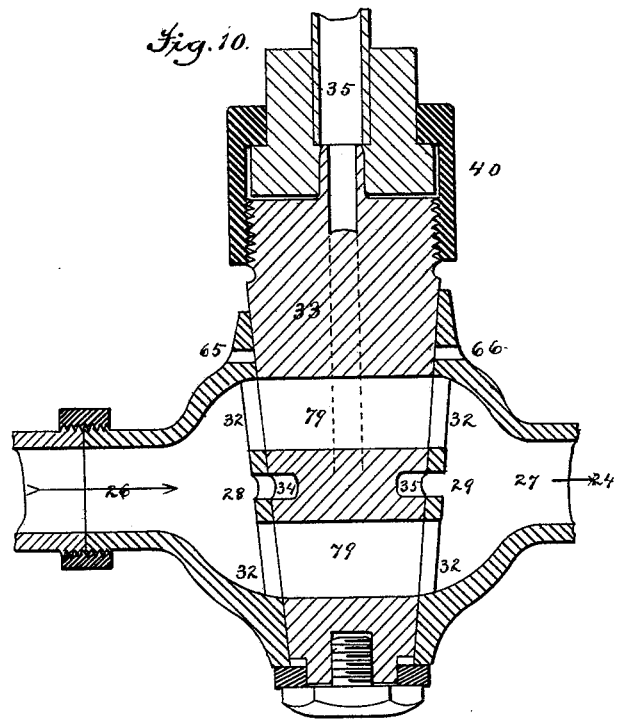

In the drawings, Figure 1 is a side elevation of one form of apparatus for carrying out my invention. Fig. 2 is a transverse vertical section of the same, taken on line 36 36, Fig. 1. Fig. 3 is a horizonal section of the same on line 37 37, Figs. 2, 6, and 7. Fig. 4 is a horizontal section of the same on line 38 38, Figs. 2, 6, and 7. Fig. 5 is a horizontal section of the same on line 71 71, Figs. 2, 6, and 7. Fig. 6 is a vertical section on line 19 19, Fig. 2. Fig. 7 is a vertical section of the same, taken on line 20 20, Fig. 6. Fig. 8 is a horizontal section of the same, taken on lines 72 72 23 23 of Figs. 2, 6, and 7. Fig. 9 is a vertical section, enlarged, taken below line 22, Figs. 2, 6, and 7. Fig. 10 is a vertical section, enlarged, of the same below line 22 22, Figs. 2, 6, and 7. Figs. 11, 12, 13, 14, and 15 are horizontal sections of the same, taken on line 24 24, Figs. 2, 6, 7, 9, and 10, showing different positions of the ports or ducts in the plug of the cock. Fig. 16 is a vertical section on line 83 83, Fig. 12. Fig. 17 is a modification of the indicating apparatus shown in Figs. 1, 2, 6, and 7; and Fig. 18 is another modification of the same.

In the drawings, 25 is a cock, connected at the end 26 with the pipe that leads from the street-main, and at the end 27 with the pipe entering the building or other place where the water is used. The shell of the cock is provided with ducts 28 29 and with ports 32, and is also preferably provided with ducts 30, 31, 65, and 66, all for purposes to be explained. This cock is provided with a plug, 33, properly fitted, and held in place by a screw and nut and spring-washer at the bottom, or in any other well-known manner. This plug 33 is provided with ducts 34 35 and ports 79, and also preferably provided with ducts 77, 78, and 80, the latter communicating with the duct 34, all for purposes to be explained.

39 is a stem, provided with chambers 34 55, connecting with the ducts indicated by the same numbers in the plug 30. This stem is connected, through a flanged screw-sleeve, to the plug 33, either by a screw on the plug and a flange on the stem 39, as shown in Figs. 1, 2, 6, 7, 8, 9, and 10, or by a flange on the plug 33 and a screw on the stem 39, bosses projecting from the plug 33 and entering recesses in the end of the stem 39 insuring the proper communication of the ducts and channels 34 35 in the stem and the plug, a suitable packing between said stem and plug preventing leakage. To the stem 39 is detachably connected an indicating apparatus now to be described.

A stem, 41, provided with ducts 34 35, connecting with and forming continuations of the chambers 34 35 in the stem 39 and ducts in the plug 33, and also provided with a plug, 42, having ducts corresponding to those 34 35. Said plug, operating to close said ducts 34 35, when desired, is connected by a screw-coupling, 40, having differential screws in it engaging with differential screws on the stems 39 and 41, bosses projecting from the stem 41 and entering recesses in the upper end of the stem 39 insuring the proper communication between the chambers 34 35 in said stem 39 and the ducts 34 35 in the stem 41, the joint being properly packed to prevent leakage. This stem 41 is connected to a casing, 44, provided with four chambers, 45, 46, 47, and 48. The chambers 45 46, filled with mercury, are connected at the bottom by a duct, 49.

The duct 34 leads into chamber 47 through a pipe, 84, extending to nearly the top of the latter, and the duct 35 into the chamber 48 through a pipe, 85, extending nearly to the top of the latter, both for a purpose to be explained.

Extending from the tops of the chambers 45, 46, 47, and 48 are tubes 50 51 52 53, connected to a casing, 54, provided with ducts 55 56 57 58, closed by screw-plugs, and with a plug, 70, having openings coinciding, when desired, with ducts 59 60 61 62 communicating with the ducts 55 56 57 58, as shown in the drawings. With the plug 70 open, as shown in Figs. 2, 6, and 7, a communication is established by the tubes and ducts 50, 61, 58, 56, 60, and 53 between the chambers 48 and 46, and by the tubes and ducts 51 62 55 59 52 between the chambers 47 45.

By removing the screw-plugs at the ends of the ducts 59 60 61 62 they and the tubes 50, 51, 52, and 53 can be readily cleaned. A screw-plug, 63, in the casing 54, when removed, allows the cleaning of the ducts 56 58 55 57 and communicating openings in the plug.

I prefer to make the tubes 50, 51, and 52 of metal. The tube 53 should be of glass or some other transparent substance. Back of this tube is placed a double adjustable scale, 67 68, graduated, as shown in the drawings, to express the quantity of water flowing per hour, which graduation is obtained by actual trial.

In the chamber 45 is a valve, 64, having its seat directly over one end of the duct 49, guided and controlled as shown in the drawings, or in any other well-known manner. This valve closes by its weight just before all the mercury in the chamber 45 is forced into chamber 46 and the mercury has reached its maximum height in tube 53.

In Fig. 17 the chambers 45 46 47 48 are shown arranged side by side, and a plug is placed in the duct 49 to control the passage of mercury through the same when desired, and the tubes 51 52 53 50 are directly connected together in pairs, as shown.

In using my invention as carried out in the forms just described, the service-pipe from the street-main to the house should be provided with a cock, constructed as above described, placed under the sidewalk, so arranged that the indicating apparatus can be readily attached and detached near the surface of the pavement.

One indicating apparatus can be applied to many cocks and stems, it being carried by the inspector.

Figure 15:
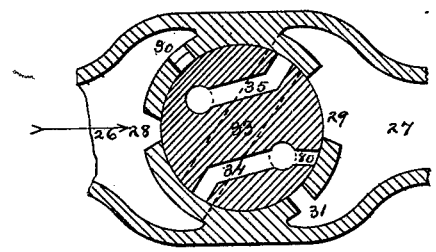
Figure 16:
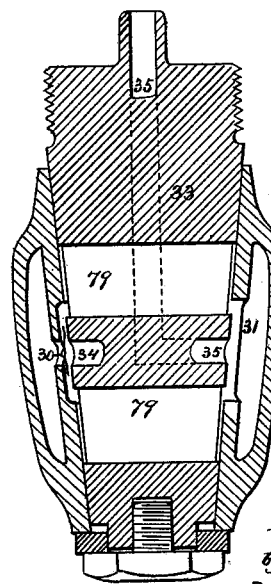

When the indicating apparatus is not connected to the stem 39, the plug of the cock is in the position indicated by Fig. 15 of the drawings to allow water to flow through the cock unless the water is to be entirely shut off.

When it is desired to discover whether water is being used or wasted at any time in the day or night, the indicating apparatus is connected to the stem 39 by the coupling 40. The plug 33 is then turned by the indicating apparatus and stem 39 preferably until its ports are in the position shown in Fig. 14 of the drawings, so that the ducts 31 80 and 35 29 coincide. The water can still pass through the ports 32 79, and the pressure of the water transmitted through the ducts and chambers 29 35 31 80 34 to the chambers 45 46 will be equal in both of the latter. The scale 67 68 is then adjusted until the mercury in tube 53 stands at zero. This is done so that in case there should be a slight difference in the size of the chambers and ducts 34 35 between any two cocks and their stems it may be compensated for. The plug 33 is then turned by the indicating apparatus and stem 39 (as it might have been in the first place except for greater exactitude) into the position shown in Fig. 13 of the drawings, when the duct 34 therein will coincide with the duct 28, and the duct 35 with the duct 29, and the ports 32 and 79 will still allow the flow of water in the direction of the arrows through the cock.

If any water is being used in the house, the water flowing in the direction of the arrow will create a pressure in the duct 34 in excess of the pressure in the duct 35, and the water rising in these ducts will compress the air in the chamber 34, which, being transmitted through the duct 34, tube 84, chamber 47, tubes 51 and 52 and connections into the chamber 45, will create a pressure in the latter in excess of that in the chamber 46, to which latter the pressure in the chamber 35 is transmitted through the duct 35, tube 85, chamber 48, tubes 50 53, and their connections, and thus causes the mercury to be pressed out of said chamber 45 into the chamber 46 and into the tube 53 until the weight of mercury in the tube 53 balances the excess of pressure in the tubes, ducts, and chambers 34, 84, 47, 51, 52, and 45, the height of the mercury determining either the velocity, weight, or quantity of water being used per minute as the same is expressed on the scale 68. If no water is being used in the house, and is therefore not flowing through the cock, the mercury will stand at the same height in the tubes 52 53.

Figure 12:
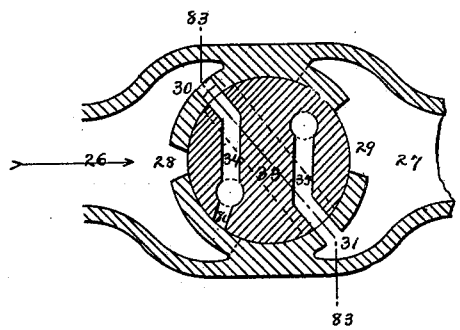
Figure 13:
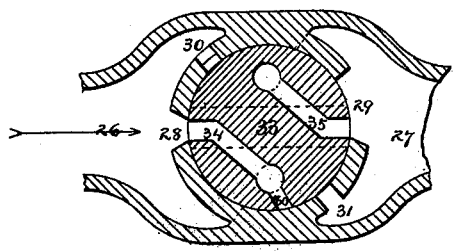

If it is desired to measure a very slight velocity, weight, or quantity of water, the plug 33 is turned by the stem 39 and indicating apparatus into the position shown in Fig. 12 of the drawings, when the ducts 34 35 will coincide with the ducts 30 and 31. The water will then pass through the duct 30 into and through the ports 79 and 31 into the house, if being used. The difference in pressure in the ducts 34 35 is then observed, as before, by the rise of the mercury in the tube 53, the height of which is read on a scale, 67, separate from the other one just referred to. The apparatus is thus used when no action of the mercury is observed when the plug is in the position just referred to, as shown in Fig. 13. After either reading has been taken the plug 33 is turned back to the position shown in Fig. 15, when the indicating apparatus is removed, and the water in the chambers 34 35 can escape through the ducts 65 66 77 78, and thus prevent freezing and rusting.

The plugs 70 and 42 may be closed when the indicating apparatus is not in use, to prevent the mercury from running out should the instrument be carelessly handled.

The tubes 84 85 may be dispensed with, if desired, their functions being merely, to prevent any mercury getting into the ducts 34 35 by careless handling.

In the modification shown in Fig. 18 of the drawings the indicating apparatus is constructed and operates as follows: The stem 41 is provided with two ducts, 34 35, communicating with the chambers 34 35 in the stem 39, which, with the coupling 40 and the cock controlling the flow of water to the place to be used, are the same as those heretofore described. The two ducts 34 35 lead into a duct, 88, entering a pipe, 89, projecting into and to nearly the top of a chamber, 90, in the casing 44, to which the stem 41 is attached. Projecting from the casing 44 is a glass tube, 91, communicating with the chamber 90 by a duct, 49. This tube 91 communicates with another tube, 92, of a larger internal diameter, which, in turn, is connected to the casing 44, and communicates with the chamber 90 through a tube, 94, extending to nearly the bottom of the latter. A plug, 93, controls the passage between the tubes 92 and 94. The ducts 34 35 in the stem 41 are controlled by a plug, 86, provided with two ports, 95 96, at right angles to each other, to communicate with the duct 34 and with a port, 97, parallel to port 96, to communicate with the duct 35.

A double scale, 67 68, is placed back of the glass tube 91, which is divided to represent flow of gallons per hour of water.

The chamber 90 is about half filled with a non-freezing liquid.

In using this modified form of indicating apparatus it is attached by the screw-coupling 40 to the stem 39, connected with a cock, 20, as before described. The plug in the cock is then turned into the position shown in Fig. 14 of the drawings, and the plugs 86 and 93 are turned into the position shown in Fig. 18, the ports then being opened. The air compressed in the chambers 34 35 passes into the chamber 90, and forces the liquid up the tubes 91 92, to the same height in both, when the reading is taken on the scale 68 and on the scale 67, for a purpose to be explained. The plug 93 is now closed, shutting off communication between the tubes 92 and 94, and the plug 86 is also turned, shutting off duct 35, but through the port 95, still leaving the duct 34 open. The stem 39 is then turned until the plug 33 of the cock 20 is in the position shown in Fig. 13 of the drawings. The air compressed in the chamber 34 passes into the chamber 90, and forces the liquid up the tube 91 against the air in the tubes 91 92 higher than before, when a reading is again taken on the scale 68. The first reading on the scale is subtracted from the second on said scale, which gives the rate of consumption or flow per hour. If no water is flowing through the cock, the liquid in the tube 91 will not rise above the first reading.

When a slight velocity, weight, or quantity of water is to be measured, the plug 33, after the first reading has been taken, as before, is turned by the stem 39 and indicating apparatus into the position shown in Fig. 12 of the drawings. A second reading is then taken on the scale 67, and if the liquid in the tube 91 then rises above the point where the first reading was taken on the scale 67, the latter is subtracted from the former to give the rate of consumption per hour. If it does not rise above said first reading, no water is being consumed.

After the desired readings are taken the stem 39 is then turned until the plug 33 is in the position shown in Fig. 15 of the drawings, the plugs 86 93 are turned to the position shown in Fig. 18, and the indicating apparatus can then be uncoupled.

Figure 11:
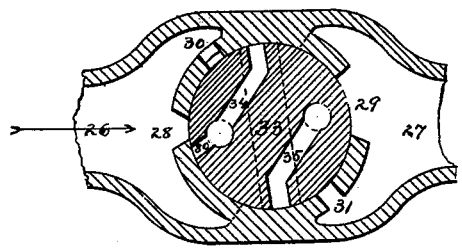
Figure 14:
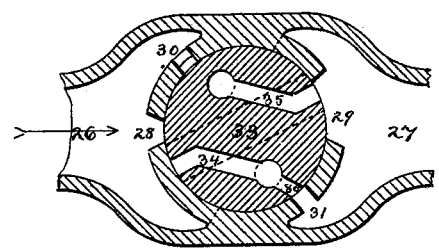

If it is desired to turn the water off from the house with either form of apparatus, this can be done by turning the plugs 33 into the position shown in Fig. 11 of the drawings.

It is obvious that the indicating apparatus can be connected to the stem 39 of either form of apparatus by a bayonet-coupling or a screw-nut with a flange, as the lower part of the stem is secured to the plug 33, or by any other well-known coupling device.

By my invention the rate of consumption of the water can be ascertained without entering the building where it is used.

Having thus described my invention, what I claim as new, and desire to secure by Letters Patent, is—

1. The method of detecting or determining waste or consumption of water by means of the different pressures due to the flow or velocity of the water in the inlet and outlet sides of a connection to the service-pipe or main transmitted to an indicating apparatus, substantially as described.

2. In a cock, the combination of a shell provided with ports 32 and ducts 29 28, and a plug provided with ports 79 and ducts 34 35, for the purpose substantially as described.

3. In a cock, the combination of a shell provided with ports and ducts 32 30 31, and a plug provided with ducts 34 35 80 and ports 79, for the purpose substantially as described.

4. In a cock, the combination of a shell provided with ports and ducts 28 29 30 31 32, and a plug provided with ducts 34 35 80 and ports 79, for the purpose substantially as described.

5. The combination, in a cock, of a shell provided with ducts 65 66 and a plug provided with ducts 77 78, for the purpose explained.

6. The combination, with a cock, the shell of which is provided with ports and ducts 28 29 32, and a plug provided with ports and ducts 34 35 79, of a stem having chambers 34 35 and an indicating apparatus, substantially as specified.

7. The combination, with a cock, the shell of which is provided with ports and ducts 30 31 32, and a plug provided with ports and ducts 34 35 80 79, of a stem having chambers 34 35 and an indicating apparatus, substantially as described.

8. The combination of a cock, the shell of which is provided with ports and ducts 28 29 30 31 32, and a plug provided with ports and ducts 34 35 79 80, of a stem having chambers 34 35 and an indicating apparatus, substantially as described.

9. The combination of a detachable indicating apparatus with a stem and cock, for the purpose described.

10. An indicating apparatus having chambers 45 46 47 48 connected together, one of each pair communicating with ducts 34 35, substantially as described.

11. An indicating apparatus having chambers 45 46 47 48, tubes 50 51 52 53, a scale, 67 or 68, and ducts 34 35, substantially as described.

12. An indicating apparatus having chambers 47 48, provided with ducts 84 85, substantially as described.

In testimony whereof I have signed my name to this specification in the presence of two subscribing witnesses.

BENJAMIN S. CHURCH.

Witnesses:
M. B. PHILIPP,
GEO. H. GRAHAM.